United States Patent [19]
Imi

[11] Patent Number: 5,635,776
[45] Date of Patent: Jun. 3, 1997

[54] CHARGE PUMP VOLTAGE CONVERTER

[75] Inventor: Toshiro Imi, Kawasaki, Japan

[73] Assignee: Texas Instruments Incorporated, Dallas, Tex.

[21] Appl. No.: 410,646

[22] Filed: Mar. 24, 1995

Related U.S. Application Data

[63] Continuation of Ser. No. 23,669, Feb. 26, 1993, abandoned.

[30] Foreign Application Priority Data

Feb. 27, 1992 [JP] Japan .................................. 4-076188

[51] Int. Cl.$^6$ .................................................. H02M 3/18
[52] U.S. Cl. ........................... 307/110; 307/109; 307/108; 363/60
[58] Field of Search ..................................... 307/108, 109, 307/110, 125, 115; 320/1; 361/245, 246; 363/59, 60, 61, 62, 63

[56] References Cited

U.S. PATENT DOCUMENTS

| | | | |
|---|---|---|---|
| 4,302,804 | 11/1981 | Bader ............................................ | 363/60 |
| 4,451,743 | 5/1984 | Suzuki et al. ............................ | 307/110 |
| 4,807,104 | 2/1989 | Floyd ...................................... | 307/110 |
| 4,922,403 | 5/1990 | Feller ...................................... | 363/60 |
| 5,159,543 | 10/1992 | Yamawaki ............................. | 307/110 |
| 5,237,209 | 8/1993 | Brewer ................................... | 307/110 |

*Primary Examiner*—William M. Shoop, Jr.
*Assistant Examiner*—Peter Ganjoo
*Attorney, Agent, or Firm*—William E. Hiller; Richard L. Donaldson

[57] ABSTRACT

A charge pump circuit which has a simple circuit configuration yet can boost the power source voltage 4 or 8 times. The + side electrode of a capacitor C1 is connected to an input terminal 10 via a diode D1; the − side electrode is connected to input terminal 10 via a switch S1 and is also connected to ground potential via a switch S2. The + side electrode of a capacitor C2 is connected to the + side electrode of capacitor C1 via a diode D2; the − side electrode is connected to the + side electrode of capacitor C1 via a switch S3 and is also connected to ground potential via a switch S4. Switching control signals PA, PB, PC, PD with the prescribed frequencies and phase are provided to switches S1, S2, S3, S4 from switch control circuit (14).

12 Claims, 6 Drawing Sheets

CHARGE PUMP VOLTAGE CONVERTER

This application is a Continuation of application Ser. No. 08/023,669, filed Feb. 26, 1993 now abandoned.

FIELD OF THE INVENTION

This invention concerns a type of charge pump circuit for boosting the voltage used by a capacitor. More specifically, this invention concerns a type of charge pump circuit appropriate for use in the power source portion within the chip of a semiconductor integrated circuit (referred to as IC hereinafter).

BACKGROUND OF THE INVENTION

FIG. 10 shows the configuration of a voltage conversion circuit using a conventional charge pump circuit. In this voltage conversion circuit, the charge pump circuit comprises capacitors c1, c3, switches s1, s2, s3, s4, oscillator 100 and inverter 102. Among switches s1, s2, s3, s4, switches s1, s3 are set ON/OFF simultaneously by pulse signal pa from oscillator 100 as the switching control signal, while switches s2, s4 are set ON/OFF simultaneously by pulse signal pb from inverter 102. As pulse signal pa output from oscillator 100 and pulse signal pb output from inverter 102 are opposite in phase, when s1, s3 are turned ON, s2, s4 are turned OFF, and when s1, s3 are turned OFF, s2, s4 are turned ON.

When switches s1, s3 are ON and switches s2, s4 are OFF, capacitor c1 is charged to voltage $V_{CC}$ by a power source with an output voltage of $V_{CC}$ through switches s1, s3. Then, as switches s1, s3 are turned OFF and switches s2, s4 are turned ON, capacitor c3 is charged to $V_{CC}$ by the voltage on capacitor c1 through switches s2, s4. As power source voltage $V_{CC}$ is applied to one electrode of capacitor c3, capacitor c3 is charged to $V_{CC}$, and its electrode on the + side is boosted to a potential of $2 V_{CC}$. In this way, as the two groups of switches s1,s2, s3,s4 are repeatedly turned ON/OFF alternately and complementarily, a doubled voltage $2 V_{CC}$, twice the power source voltage $V_{CC}$, is obtained at output terminal 104.

Capacitors c2, c4 and switches s5, s6, s7, s8 set in the latter section of the voltage conversion circuit form a polarity inverter for inverting the polarity of voltage $2 V_{CC}$ at output terminal 104. Among switches s5, s6, s7, s8, switches s5, s7 are turned ON/OFF together with the aforementioned switches s2, s4, while switches s6, s8 are turned ON/OFF together with said switches s1, s3.

In this polarity inverter, when switches s5, s7 are turned ON and switches s6, s8 are turned OFF, capacitor c2 is charged to $2 V_{CC}$ by voltage $2 V_{CC}$ at output terminal 104 or on the + side of the electrode of capacitor c3 via switches s5, s7. Then, as switches s5, s7 are turned OFF and switches s6, s8 are turned OFF, capacitor c4 is charged to voltage of $2 V_{CC}$ by the voltage on capacitor c2 via switches s6, s8. Since the electrode on the + side of capacitor c4 is connected to ground potential (zero volts), the potential on one electrode of capacitor c4 becomes $-2 V_{CC}$; at output terminal 106, the output voltage $2 V_{CC}$ of output terminal 104 has its polarity inverted to form an output voltage $-2 V_{CC}$.

FIG. 11 shows the circuit configuration of a conventional line driver/receiver IC 110 as an example of the method used when the aforementioned voltage conversion circuit is utilized. In this line driver/receiver IC circuit configuration, voltage conversion circuit 112 is used to obtain the operating voltage of line driver 114 according to code EIA-232-D by means of a single power source voltage $V_{CC}$. According to code EIA-232-D, the output voltage $V_0$ of the line driver is in the range of +5 V<$V_0$<+15 V, -5 V>$V_0$>-15 V. In conventional voltage conversion circuit 112, since a bipolar voltage $+2 V_{CC}$, $-2 V_{CC}$ twice the power source voltage $V_{CC}$ is generated, where a +5 V single power source voltage $V_{CC}$ is used, it is possible to obtain the drive line output voltages $V_{DD}$, $V_{SS}$ of +10 V and -10 V, respectively, to meet the demand by code EIA-232-D.

In addition, +5 V single power source voltage $V_{CC}$ is only supplied as the operation voltage to line receiver 116.

On the other hand, in the portable information processing equipment recently developed, in order to realize low power consumption, the power source voltage is changed from 5 V to 3.3 V. In this case, in line driver/receiver IC 110 shown in FIG. 11, since the power source voltage $V_{CC}$ is input as a voltage of 3.3 V, the line driver output voltages $V_{DD}$, $V_{SS}$ obtained from voltage conversion circuit 112 are at most +6.6 V and -6.6 V, respectively. This voltage level, however, fails to provide a sufficient margin for the EIA-232-D code.

If the conventional charge pump method is to be used to solve this problem, the only way to solve this problem is to use the voltage conversion circuit shown in FIG. 10 in which another stage of the charge pump circuit is added to form a 2-stage type charge pump circuit. In this case, the numbers of parts of capacitors c1, c3 and switches s1, s2, s3, s4 are doubled to 4 and 8, respectively. However, as shown in FIG. 11, capacitors c1, c3 are parts annexed to line driver/receiver IC 110. Consequently, as the number of capacitors is doubled, not only is the reliability of operation degraded, it also becomes difficult to form a small-sized lightweight circuit substrate. Also, as the number of switches s1, s2, s3, s4 is doubled, the IC design becomes more complex, and the cost increases.

SUMMARY OF THE INVENTION

The purpose of this invention is to solve the aforementioned problems of the conventional methods by providing a type of charge pump circuit characterized by the fact that the voltage can be boosted by a factor of 4 or 8 by means of a simple circuit configuration.

This invention provides a type of charge pump circuit characterized by the fact that it comprises the following parts: a first capacitor having two electrodes, with one of the electrodes connected via a first rectifying means to a voltage source for providing a prescribed voltage and the other electrode connected to a first switching means to a prescribed reference potential and also connected via a second switching means to the aforementioned voltage source; a second capacitor having two electrodes, with one of the electrodes connected via a second rectifying means to the aforementioned first electrode of the aforementioned first capacitor and with the other electrode connected via a third switching means to the aforementioned reference potential and also connected via a fourth switching means to the aforementioned first electrode of the aforementioned first capacitor; and a switching control means which alternately sets the aforementioned first and second switching means ON/OFF with a prescribed period, and which alternately sets the aforementioned third and fourth switching means ON/OFF within each period of the aforementioned prescribed period.

When the first switching means is ON and the second switching means is OFF, the first capacitor is charged to a level between the voltage of the power source and the reference potential via the first rectifying means and the first switch. Then, when the first switching means is turned OFF and the second switching means is turned ON, the other electrode of the first capacitor has its potential clamped; hence, the voltage of one electrode of the first capacitor is boosted to a voltage level equal to the sum of the power source voltage and the charging voltage, and this voltage level can be maintained for a prescribed period. In this period, on the side of the second capacitor, first, the fourth switching means is turned OFF and the third switching means is turned ON; in this case, [the second capacitor] is charged to a voltage between the voltage of the first capacitor and the reference potential via the second rectifying means and the third switch. Then, when the fourth switching means is turned ON and the third switching means is turned OFF, the other electrode of the second capacitor is clamped to the voltage of one electrode of the first capacitor via the fourth switching means, and the voltage obtained on one electrode of the second capacitor is equal to the sum of the charging voltage of the first capacitor and the charging voltage of the second capacitor connected in series.

BRIEF DESCRIPTION OF THE DRAWINGS

FIGS. 2(A)-2(G) illustrate the operation timing or voltage waveforms of the various portions during the operation of the charge pump circuit shown in FIG. 1;

FIGS. 5(A)-5(I) illustrate the operation timing or voltage waveforms of the various portions during the operation of the voltage conversion circuit shown in FIGS. 3 or 4;

Figure 1:
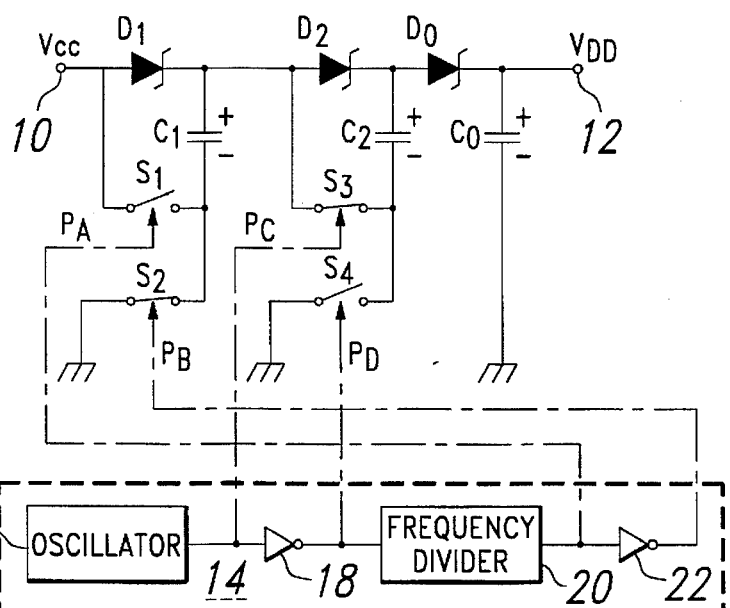
FIG. 1 is a circuit diagram illustrating a circuit configuration of one embodiment of a charge pump circuit in accordance with the invention.
Figure 2E:
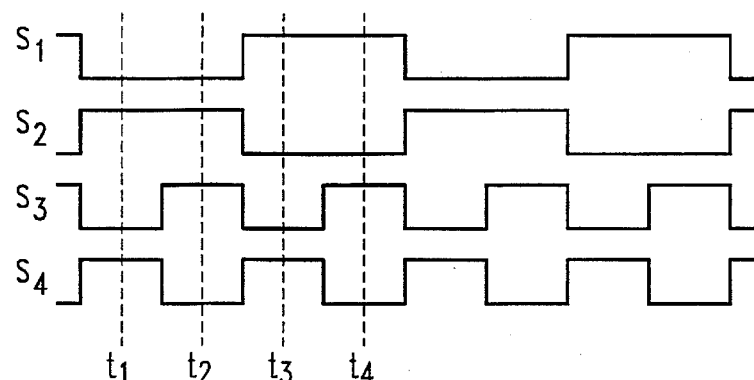
Figure 2E:
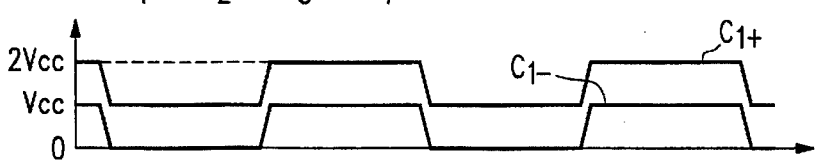
Figure 2F:
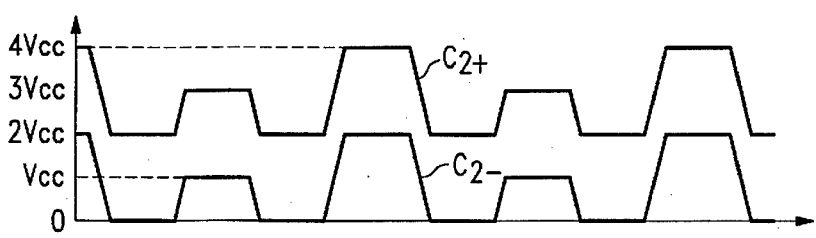
Figure 2G:
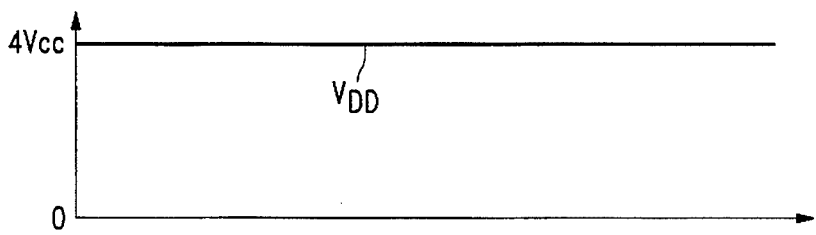

In reference symbols as shown in the drawings:
C1, capacitor
C2, capacitor
C0, capacitor
D1, diode
D2, diode
D0, diode
10, input terminal
12, output terminal

DESCRIPTION OF PREFERRED EMBODIMENTS

In the following, embodiments of this invention will be explained in more detail with reference to FIGS. 1–9. FIG. 1 shows the basic circuit configuration of the charge pump circuit in an embodiment of this invention. In this charge pump circuit, a prescribed power source voltage $V_{CC}$ is input to input terminal 10, while an output voltage $V_{DD}$, quadrupled power source voltage $V_{CC}$, 4 $V_{CC}$, is output from output terminal 12.

For capacitor C1, the + side electrode is connected via diode D1 to input terminal 10, and the − side electrode is connected via switch S1 to input terminal 10 and via switch S2 to ground potential. In addition, for diode D1, the anode is connected to the input terminal and the cathode is between input terminal 10 and first capacitor C1 in an appropriate direction to ensure connection to the + side electrode of capacitor C1. For example, the two switches S1, S2 are analog switches made of transistor switches; they are turned ON/OFF alternately upon receiving pulse signals PA, PB of opposite phase from switch control circuit 14.

For capacitor C2, the + side electrode is connected to the + side electrode of capacitor C1 via diode D2, and the − side electrode is connected via switch S3 to the + side electrode of capacitor C1 and via switch S4 to ground potential. For diode D2, the anode is connected to the + side electrode of capacitor C1, and the cathode is inserted between capacitor C1 and capacitor C2 in an appropriate direction to ensure connection to the + side electrode of capacitor C2. For example, two switches S3, S4 are analog switches made of transistor switches; they are turned ON/OFF alternately upon receiving pulse signals PC, PD of opposite phase from switch control circuit 14.

For capacitor C2, the + side electrode is connected via diode D0 to + side electrode of capacitor C0 and output terminal 12. For output capacitor C0, the − side electrode is grounded. For anode D0, the anode is connected to the + side electrode of capacitor C2, and the cathode is between capacitor C2 and capacitor C0 in an appropriate direction to ensure connection to the + side electrode of capacitor C0.

Switch control circuit 14 comprises oscillator 16, inverter 18, frequency divider 20, and inverter 22, which are connected in series. The pulse signal with a prescribed frequency output from oscillator 16 has its phase inverted by inverter 18; then, the frequency is divided to ½ by frequency divider 20, followed by inversion of phase by means of inverter 22. The output pulse of oscillator 16, the output pulse of inverter 18, the output pulse of inverter 18, the output pulse of frequency divider 20, and the output pulse of inverter 22, obtained in this switch control circuit 14 are sent as switch control signals PC, PD, PA, PB to the control terminals of switches S3, S4, S1, and S2, respectively.

In the following, the operation of the charge pump circuit with the aforementioned configuration will be explained with reference to the timing diagrams or voltage waveforms shown in FIG. 2. In FIGS. 2(A)-2(G), A, B, C, D show the timing of ON/OFF switching of switches S1, S2, S3, S4, respectively; E shows the waveforms of the potential C1+ on the + side electrode of capacitor C1 and the potential C1− on the − side electrode; F shows the waveforms of the potential C2+ on the + side electrode of capacitor C2 and the potential C2− on the − side electrode; and G shows the voltage waveform of output voltage $V_{DD}$ obtained from output terminal 104.

First, when S2, S4 are ON and S1, S3 are OFF (such as at time t1), capacitor C1 is charged to voltage $V_{CC}$, a voltage between the power source voltage and ground potential, through input terminal 10, diode D1, and switch S2. Consequently, the potential on the + side electrode of capacitor C1 becomes $V_{CC}$, while the potential of the − side electrode becomes zero. On the other hand, capacitor C2 is not charged, and is kept at charging voltage 2 $V_{CC}$. At this time, the − side electrode of capacitor C2 is connected to ground potential via switch S4; hence, the potential of the + side electrode of capacitor C2 becomes 2 $V_{CC}$.

Then, when S2, S3 are ON, and S1, S4 are OFF (such as at time t2), capacitors C1, C2 are kept at charging voltages of $V_{CC}$ and 2 $V_{CC}$, respectively, and the + side electrode of capacitor C1 is connected to the − side electrode of capacitor C2 via switch S3. In this way, the potentials of the − side electrode and the + side electrode of capacitor C2 become $V_{CC}$ and 3 $V_{CC}$, respectively.

Then, when S1, S4 are ON and S2, S3 are OFF (such as at time point t3), the − side electrode of capacitor C1 is connected via switch S1 to input terminal 10, and the potential of the + side electrode of capacitor C1 is boosted to a voltage of 2 $V_{CC}$, that is, the sum of charging voltage $V_{CC}$ and power source voltage $V_{CC}$ on the side of input terminal 10. On the other hand, the − side electrode of capacitor C2 is grounded via switch S4, and when its charging voltage becomes lower than 2 $V_{CC}$, it is charged by charging voltage $V_{CC}$ of capacitor C1.

Then, when S1, S3 are ON and S2, S4 are OFF (such as at time point t4), the − side electrode of capacitor C1 is connected to input terminal 10 via switch S1, and the + side capacitor of capacitor C1 and the − side electrode of capacitor C2 are connected to each other via switch S3. Consequently, the potential of the + side electrode of capacitor C2 is boosted to 4 $V_{CC}$, that is, the sum of power source voltage on the side of input terminal 10, charging voltage $V_{CC}$ of capacitor C1, and charging voltage 2 $V_{CC}$ of capacitor C2. In this case, when the charging voltage of output capacitor C0 becomes lower than 4 $V_{CC}$, output capacitor C0 is charged by charging voltage 2 $V_{CC}$ of capacitor C2, and the charging voltage returns to 4 $V_{CC}$. Consequently, at output terminal 12, an output voltage $V_{DD}$ of 4 $V_{CC}$ with a stable voltage level is obtained.

In this way, for the charge pump circuit in this embodiment, by using two capacitors C1, C2, four switches S1, S2, S3, S4, and two diodes D1, D2, and a switch control circuit 14, the power source voltage $V_{CC}$ is boosted four times, and the quadrupled voltage 4 $V_{CC}$ can be obtained periodically. In addition, by setting a capacitor C0 and a diode D0, voltage 4 $V_{CC}$, which is four times the power source voltage $V_{CC}$, can be output as an almost steady dc voltage $V_{DD}$.

Figure 3:
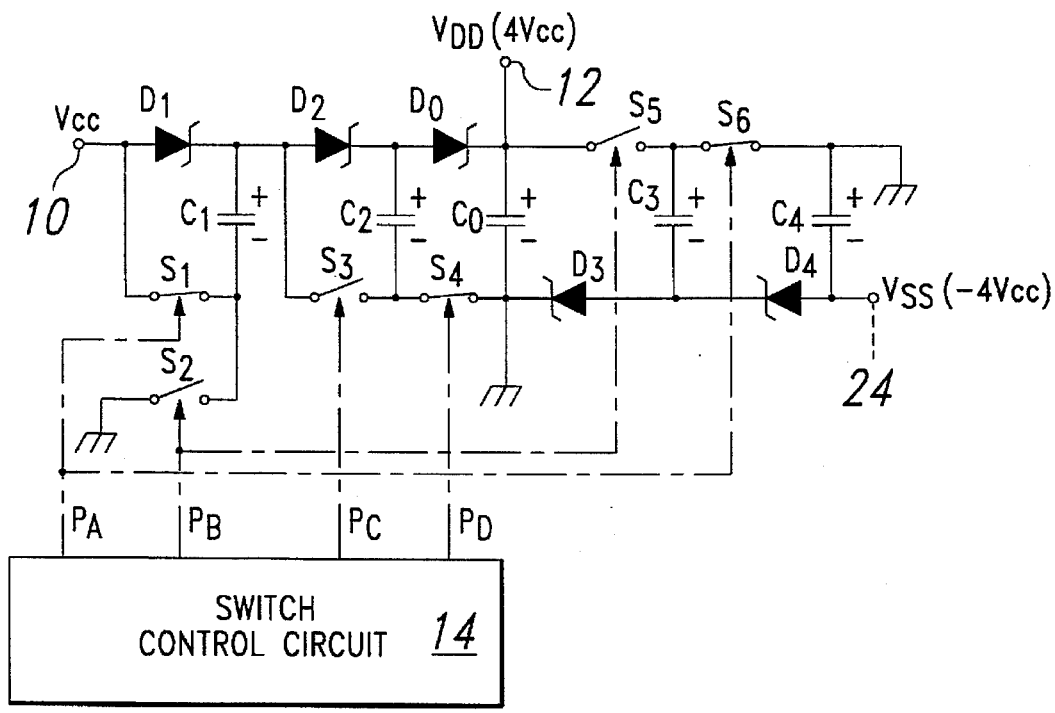
FIG. 3 is a circuit diagram illustrating the circuit configuration of a voltage conversion circuit using the charge pump circuit shown in FIG. 1.

In the following, an explanation will be presented for the voltage conversion circuit using the aforementioned charge pump circuit shown in FIG. 1, with reference to FIGS. 3, 4, and 5(A)–5(I). FIG. 3 shows the circuit configuration of the voltage conversion circuit in an embodiment. In this voltage conversion circuit, a polarity inversion circuit is added to the charge pump circuit shown in FIG. 1. Consequently, from the output terminal of the charge pump circuit (first output terminal 12), a quadrupled power source voltage $V_{CC}$ 4 $V_{CC}$ is output as output voltage $V_{DD}$, while from the output terminal of the polarity inversion circuit (the second output terminal 24), a negative quadrupled power source voltage $V_{CC}$ −4 $V_{CC}$ is output as output voltage $V_{SS}$.

In this voltage conversion circuit, the polarity inversion circuit comprises a conventional circuit configuration including capacitors C3, C4, switches S5, S6, diode D3, D4. Switches S5, S6 are turned ON/OFF alternately by using the same switch control signals PA, PB as for switches S1, S2.

FIGS. 5(A)–5(I) show the operation timing or voltage waveforms at the various portions in the voltage conversion circuit. In FIG. 5, A–G show the operation timing or voltage waveforms of the various portions in the charge pump circuit. A, B, H, I show the operation timing or voltage waveforms of the various portions in the polarity inversion circuit. In the polarity inversion circuit, when electrode S5 is ON and switch S6 is OFF, capacitor C3 is charged to 4 $V_{CC}$ by charging voltage 4 $V_{CC}$ of output capacitor C0 via switch S5 and diode D3; when switch S5 is OFF and switch S6 is ON, capacitor C4 is charged to 4 $V_{CC}$ by the charging voltage 4 $V_{CC}$ of capacitor C3 via switch S6 and diode D4. Since the +side electrode of capacitor C4 is connected to ground potential, a negative voltage −4 $V_{CC}$ is obtained on the − side electrode of capacitor C4, and this negative voltage −4 $V_{CC}$ is output as output voltage $V_{SS}$ from output terminal 24.

Figure 4:
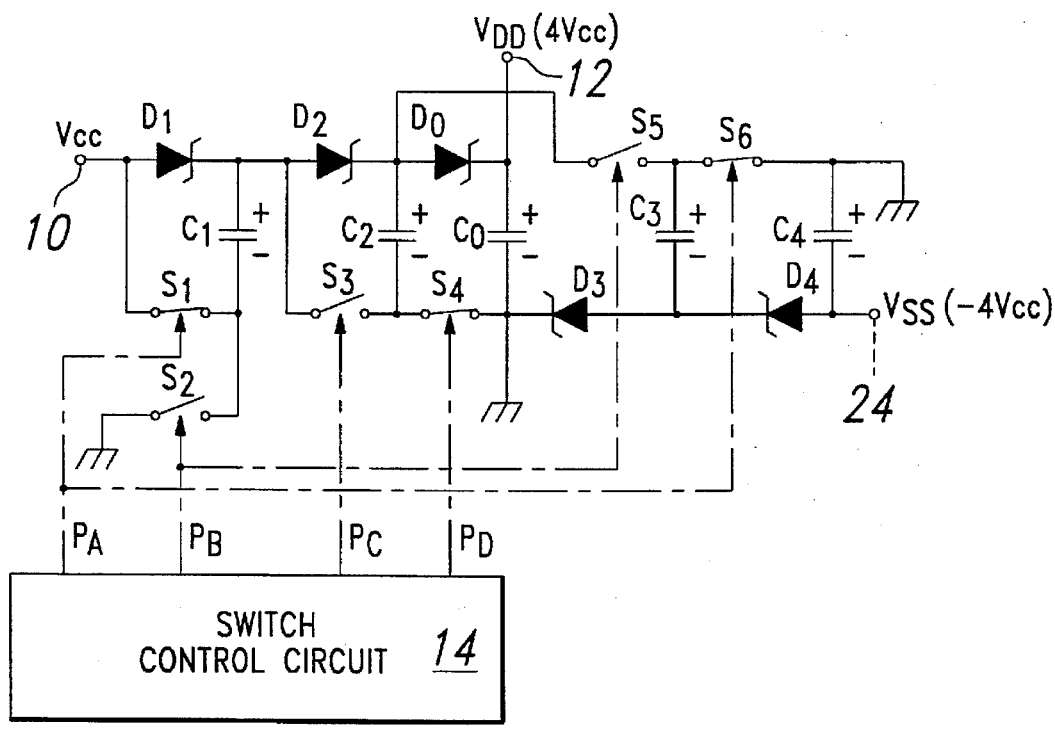
FIG. 4 is a circuit diagram illustrating the configuration of the circuit in a modified example of the voltage conversion circuit shown in FIG. 3.
Figure 5E:
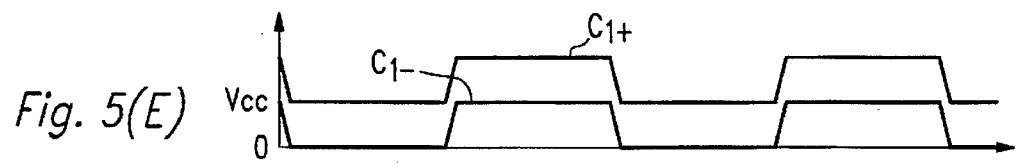
Figure 5F:
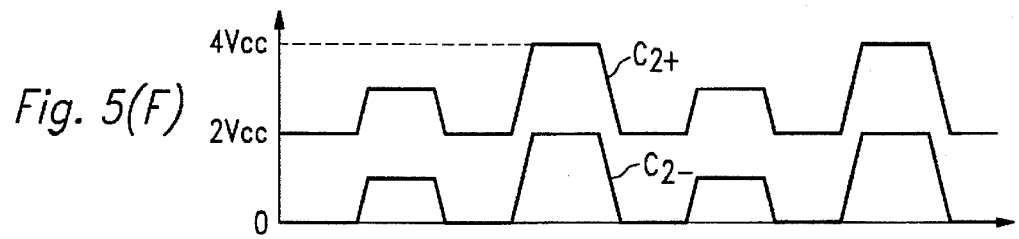
Figure 5G:
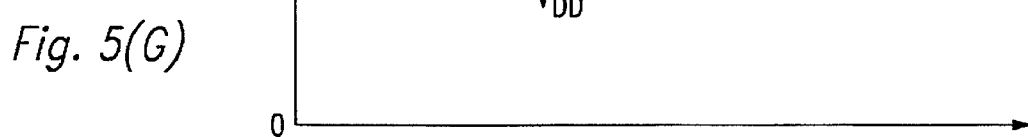
Figure 5H:
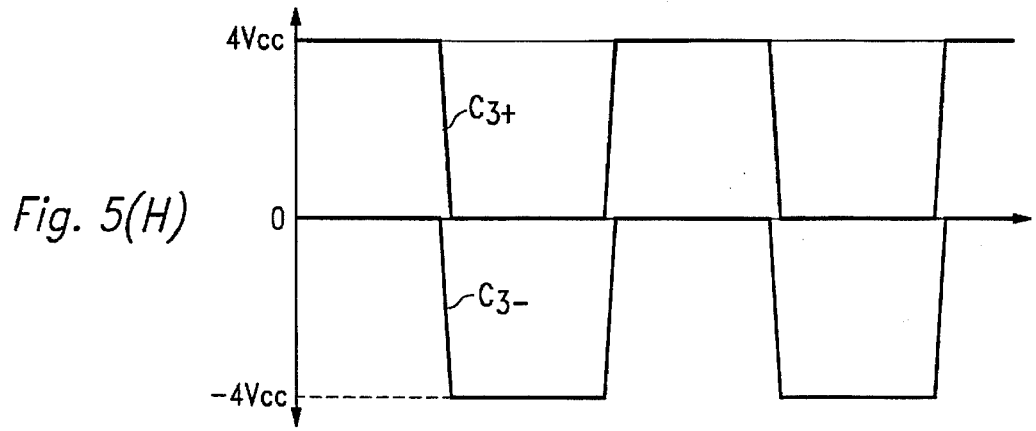
Figure 5I:
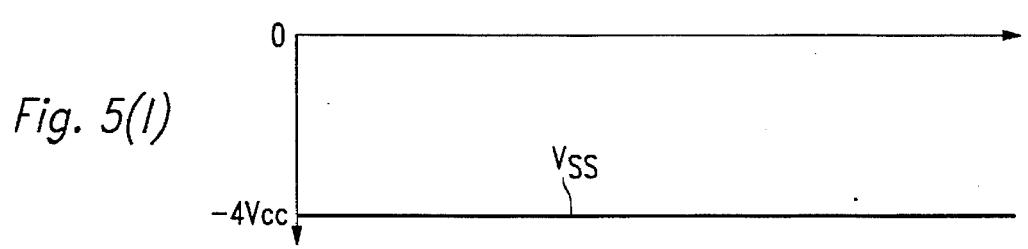

FIG. 4 shows a modified example of the voltage conversion circuit shown by FIG. 3. In this modified example, the input terminal of the polarity inversion circuit, that is, the + side electrode of capacitor C3, is not connected to the + side electrode of output capacitor C0 or output terminal 12; instead, it is connected to the + side electrode of capacitor C2 of the charge pump circuit. In this circuit configuration, since the charging voltage of capacitor C2 is sent to capacitor C3 without going through diode D3, capacitor C3 can be charged effectively, and hence capacitor C4 can be charged effectively without any drop in voltage caused by diode D3.

Figure 6:
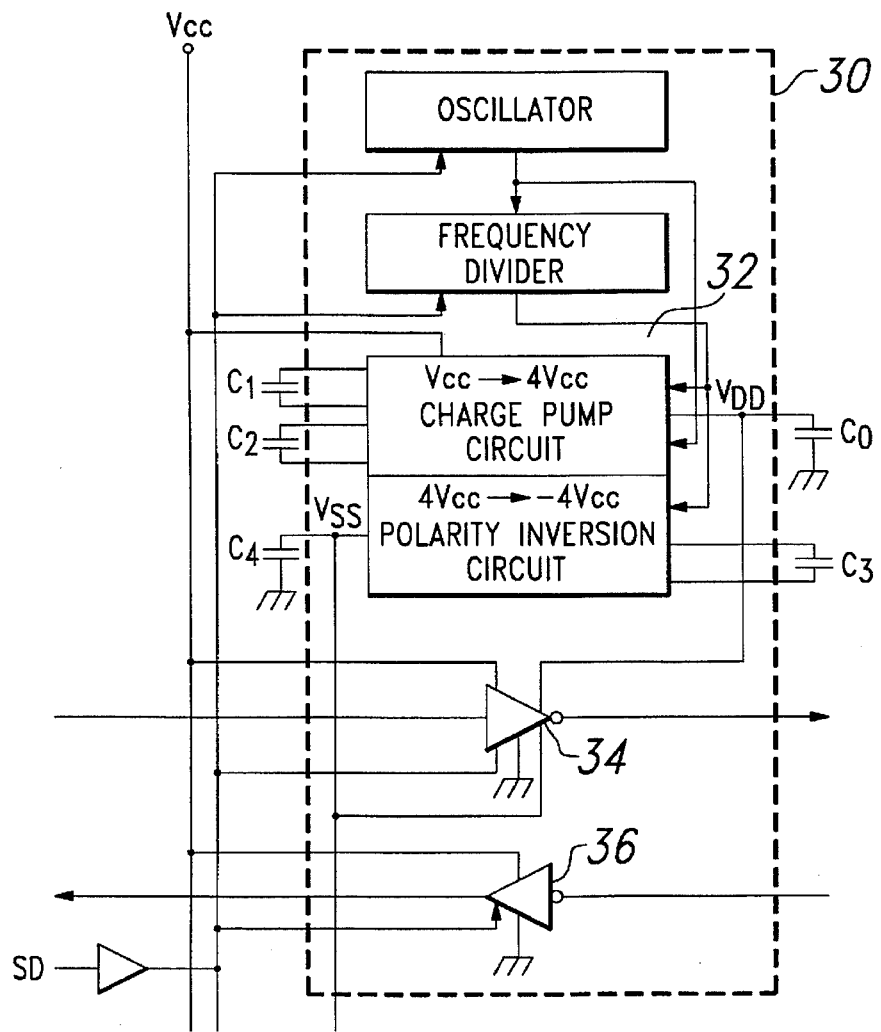
FIG. 6 is a circuit diagram illustrating an embodiment of the line driver/receiver IC using the voltage conversion circuit shown in FIGS. 3 or 4.

FIG. 6 shows an example of the configuration of the line driver/receiver IC using the voltage conversion circuit in this example. In this line driver/receiver IC 30, voltage conversion circuit 32 has the circuit configuration shown in FIGS. 3 or 4; a positive voltage $V_{DD}$, 4 $V_{CC}$ four times the power source voltage $V_{CC}$, and negative voltage $V_{SS}$, −4 $V_{CC}$ are output as the operating voltages of line driver 34. Consequently, in this line driver/receiver IC 30, even when the power source voltage $V_{CC}$ is, for example, 3.3 V, it is still able to obtain operating voltages of +13.2 V and −13.2 V by means of voltage conversion circuit 32. Consequently, within a sufficient margin, the standards of EIA-232-D can be met.

In voltage conversion circuit 32, capacitors C0, C1–C4 are annexed to the outside of line driver/receive IC 30. In this example, when line driver 34 and line receiver 36 are not used, the current in line driver/receiver IC 30 is cut off to reduce the power consumption. For this purpose, a shutdown signal SD is sent to the various portions within line driver/receiver IC 30.

Figure 7:
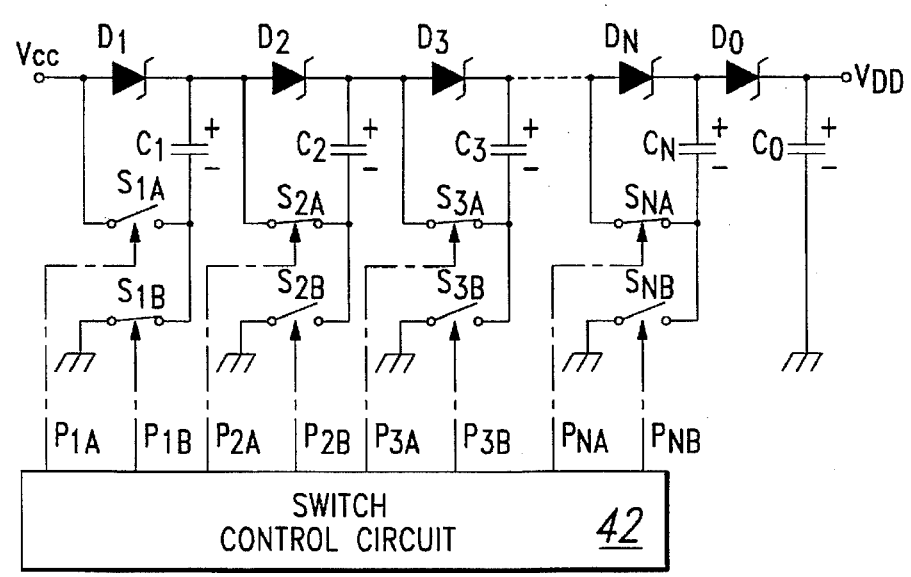
FIG. 7 is a circuit diagram illustrating the circuit configuration of a multistage charge pump device in an embodiment of this invention.

FIG. 7 shows an embodiment of the circuit configuration of a multistage type charge pump circuit. In this charge pump circuit device, N stages (where N is an arbitrary positive integer) of a boosting circuit comprising capacitor C1, diode D1, switch SiA, and switch SiB are connected in cascade, and at output terminal 40, a voltage $2^N V_{CC}$, which is $2^N$ times power source voltage $V_{CC}$. In each stage of the booster circuit, switches SiA and SiB are turned ON/OFF alternately by means of switching pulses PiA and PiB of opposite phase from switch control circuit 42. The relation between switching pulses PiA, PiB and Pi+1A, Pi+1B is that the former PiA, PiB are the ½ frequency-divided pulses of the latter Pi+1A, Pi+1B.

In this charge pump device, one unit of the charge pump circuit comprises a continuous, an arbitrary pair of booster circuits. The output voltage of any given charge pump circuit is four times the output voltage of the charge pump circuit of the former stage. In this way, the input voltage of the charge pump circuit of this invention is not limited to the voltage of the power source; any voltage with a prescribed steady or periodic level may be used as well. Consequently, according to this invention, the power source voltage can be supplied from any circuit that can provide a prescribed steady or periodic voltage.

Figure 8:
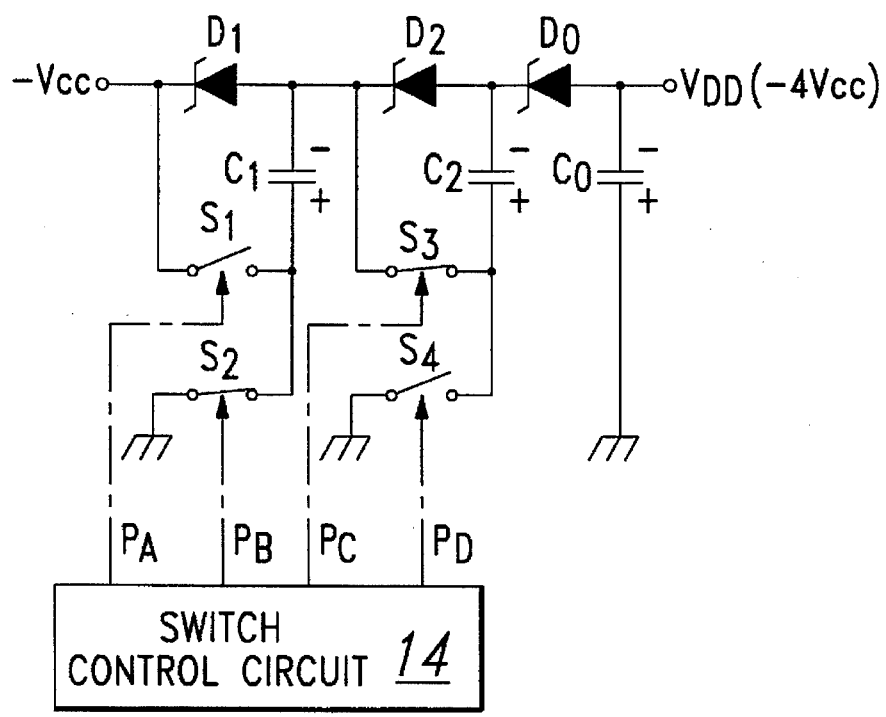
FIG. 8 is a circuit diagram illustrating the circuit configuration of a charge pump circuit in an embodiment of this invention in which the negative power source voltage is doubled.

FIG. 8 shows an embodiment of the circuit configuration of a charge pump circuit used for doubling the negative power source voltage. This charge pump circuit has a configuration of the same components as the circuit shown in FIG. 1. However, diodes D0, D1, D2 are reversed, compared to those shown in FIG. 1; that is, the cathode is connected to the input side, and the anode is connected to the output side. In addition, the polarity of the electrodes of capacitors C1, C2, C0, is inverted.

Figure 9:
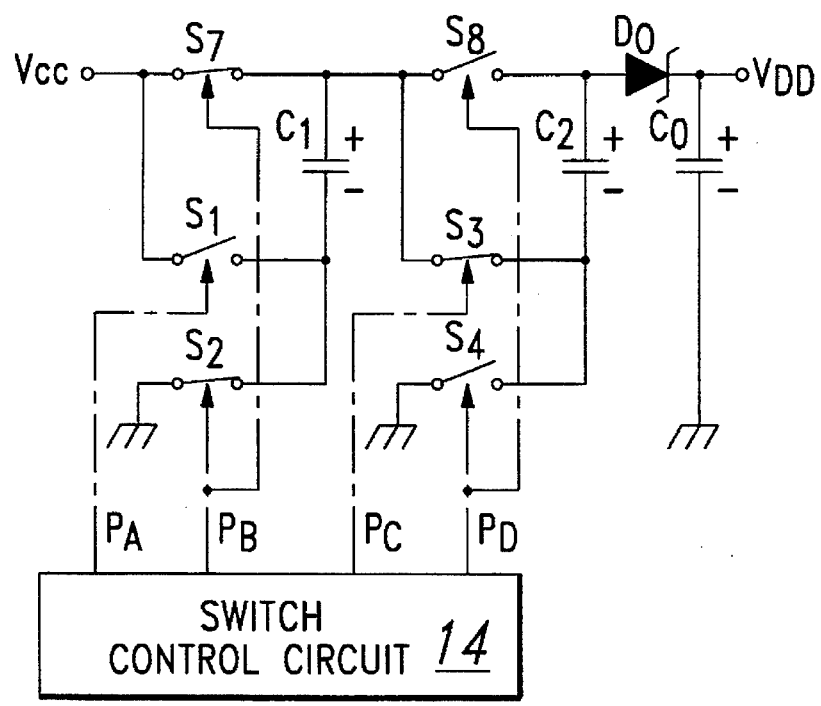
FIG. 9 is a circuit diagram illustrating the circuit configuration of a charge pump circuit in an embodiment of this invention with switches used as the rectifying means.
Figure 10:
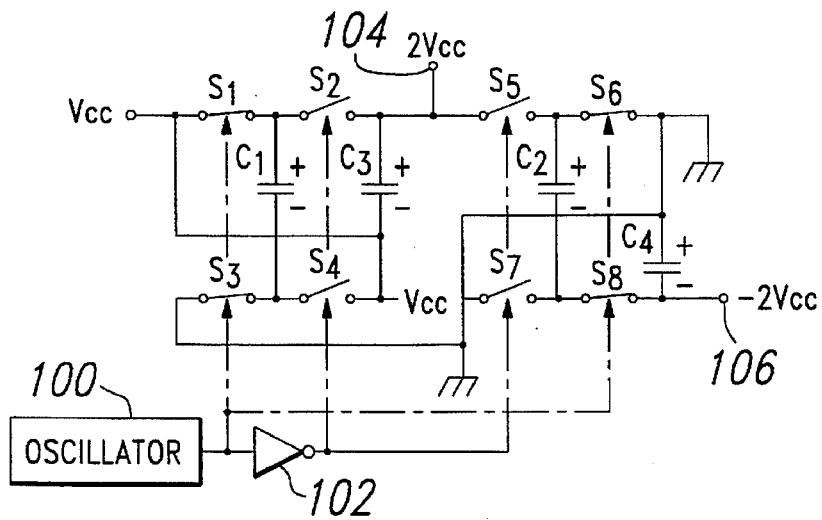
FIG. 10 is a circuit diagram illustrating the circuit configuration of a voltage conversion circuit using a conventional charge pump circuit.
Figure 11:
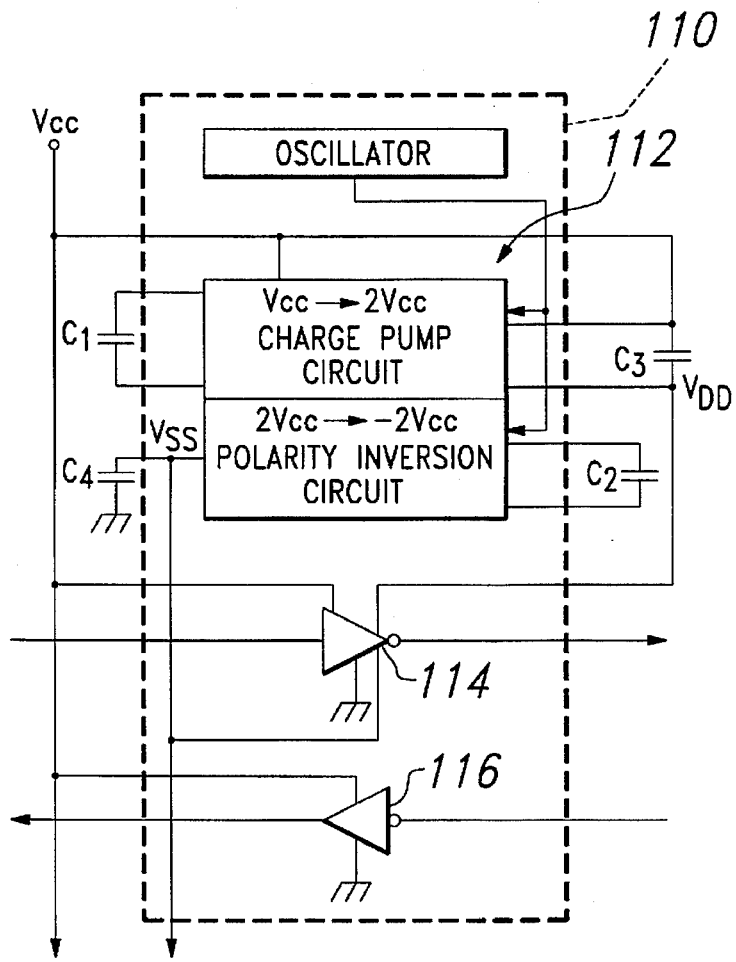
FIG. 11 is a diagram illustrating the circuit configuration of a line driver/receiver IC using the voltage conversion circuit shown in FIG. 10.

FIG. 9 shows an embodiment of a charge pump circuit in accordance with this invention in which switches S7, S8 are used instead of diodes D1, D2 as the rectifying means. For example, switches S7, S8 may be transistor switches, which are turned ON only during the period when capacitors C1, C2 are charged, since the switches are turned ON/OFF together with switches S2, S4 by means of switching pulses PB, PD. However, it is also possible to use a switch to substitute for diode D0 at the output.

In the charge pump circuit in the aforementioned embodiments, the ground potential was set as the reference potential. However, any constant voltage may be used as the reference potential.

As explained above, for the charge pump circuit of this invention, by connecting N stages of booster circuits, each of which comprises one capacitor, one rectifying means, and two switching means in a cascade configuration, it is possible to boost the input voltage $2^N$ times.

I claim:

1. A charge pump circuit comprising:

an input terminal for receiving an input voltage from a power voltage source;

a plurality of charge pump circuit stages including an initial stage, at least one intermediate stage, and a final stage;

an output terminal connected to the final stage for producing an output voltage as a power source voltage;

each of said stages including a capacitor having first and second electrodes of opposite polarities, a rectifying means, and first and second switches;

the capacitor of said initial stage being connected via one of said first and second electrodes to said input terminal;

the rectifying means of said initial stage interposed in the connection between said one of said first and second electrodes of the initial stage capacitor and said input terminal;

the other of said first and second electrodes of said initial stage capacitor being connected to said input terminal and to a predetermined reference potential;

the first switch of said initial stage interposed in the connection between the other of said first and second electrodes of said initial stage capacitor and said input terminal;

the second switch of said initial stage interposed in the connection between the other of said first and second electrodes of said initial stage capacitor and the predetermined reference potential;

the capacitor of the intermediate stage adjacent to said initial stage being connected via one of said first and second electrodes thereof to said one of said first and second electrodes of said initial stage capacitor;

the rectifying means of said intermediate stage adjacent to said initial stage interposed in the connection between said one of said first and second electrodes of the intermediate stage capacitor and said one of said first and second electrodes of said initial stage capacitor;

the other of said first and second electrodes of said intermediate stage capacitor being connected to said one electrode of said first and second electrodes of said initial stage capacitor and to the predetermined reference potential;

the first switch of said intermediate stage adjacent to said initial stage being interposed in the connection between the other of said first and second electrodes of said intermediate stage capacitor and said one of said first and second electrodes of said initial stage capacitor;

the second switch of said intermediate stage adjacent to said initial stage being interposed in the connection between the other of said first and second electrodes of said intermediate stage capacitor and the predetermined reference potential;

the capacitor of said final stage being connected via one of said first and second electrodes thereof to said one of said first and second electrodes of the capacitor of an intermediate stage adjacent thereto;

the rectifying means of said final stage interposed in the connection between said one of said first and second electrodes of the final stage capacitor and said one of said first and second electrodes of the capacitor of the intermediate stage adjacent thereto;

the other of said first and second electrodes of said final stage capacitor being connected to said one electrode of said first and second electrodes of the capacitor of said intermediate stage adjacent to said final stage and to the predetermined reference potential;

the first switch of said final stage being interposed in the connection between the other of said first and second electrodes of said final stage capacitor and said one electrode of said first and second electrodes of said capacitor of the intermediate stage adjacent thereto;

the second switch of said final stage being interposed in the connection between the other of said first and second electrodes of said final stage capacitor and the predetermined reference potential; and switching control means operably associated with each of said first and second switches for each of said plurality of charge pump circuit stages for alternately setting said first and second switches ON/OFF within a prescribed time period;

said output terminal producing an output voltage as a power source voltage of significantly boosted magnitude over the input voltage received at said input terminal.

2. A charge pump circuit as set forth in claim 1, further including an output capacitor having first and second electrodes of opposite polarities, said output capacitor being connected via one of said first and second electrodes to said one of said first and second electrodes of said final stage capacitor and to said output terminal; and an output rectifying means interposed in the connection between said one of said first and second electrodes of said output capacitor and said one of said first and second electrodes of said final stage capacitor;

said rectifying means of each of the stages included in said plurality of charge pump circuit stages being connected in series to said output terminal and cooperating to produce a steady-state D.C. voltage as the output voltage at said output terminal.

3. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrode thereof to said one of said first and second electrodes of said first capacitor;

a second rectifying means interposed in the connection between said one of said first and second electrodes of said second capacitor and said one of said first and second electrodes of said first capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period, said switching control means comprising an oscillator, a frequency divider, and first and second inverters, said first inverter being connected between the output of said oscillator and said frequency divider, said second inverter being connected to the output of said frequency divider, said oscillator having its output connected to said third switch and said first inverter having an output connected to said fourth switch, said frequency divider having an output connected to said first switch and said second inverter having an output connected to said second switch, and the outputs of said oscillator, said first inverter, said frequency divider and said second inverter serving as switch control signals for regulating the ON/OFF states of said first, second, third and fourth switches providing for boosting of the input voltage from the power voltage source as received by said input terminal; and an output terminal connected to said second rectifying means for producing an output voltage as a power source voltage of significantly boosted magnitude over the input voltage received at said input terminal.

4. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrodes thereof to said one of said first and second electrodes of said first capacitor;

a second rectifying means interposed in the connection between said one of said first and second electrodes of said second capacitor and said one of said first and second electrodes of said first capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period;

an output terminal connected to said second rectifying means for producing an output voltage as a power source voltage of significantly boosted magnitude over the input voltage received at said input terminal; and a polarity inversion circuit connected to the output of said second rectifying means and having a second output terminal;

the output voltage from said second output terminal being of opposite polarity with respect to the output voltage from the first-mentioned output terminal.

5. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal, said first rectifying means comprising a first diode having a cathode connected to said input terminal and an anode connected to said one of said first and second electrodes of said first capacitor;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrodes thereof to said one of said first and second electrodes of said first capacitor;

a second rectifying means interposed in the connection between said one of said first and second electrodes of said second capacitor and said one of said first and second electrodes of said first capacitor, said second rectifying means comprising a second diode having a cathode connected to said one of said first and second electrodes of said first capacitor and an anode connected to said one of said first and second electrodes of said second capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period; and an output terminal connected to the anode of said second diode defining said second rectifying means for producing an output voltage as a power source voltage of significantly boosted magnitude over the input voltage received at said input terminal.

6. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrodes thereof to said one of said first and second electrodes of said capacitor;

a second rectifying means interposed in the connection between said one of said first and second electrodes of said second capacitor and said one of said first and second electrodes of said first capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period;

said first and second rectifying means respectively comprising first and second rectifying switches operably connected to said switching control means for operation in common with said second and fourth switches in assuming an ON/OFF state in unison with said second and fourth switches respectively; and an output terminal connected to said second rectifying switch for producing an output voltage as a power source voltage of significantly boosted magnitude over the input voltage received at said input terminal.

7. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal, said first rectifying means comprising a first diode having a cathode connected to said input terminal and an anode connected to said one of said first and second electrodes of said first capacitor;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrodes thereof to said one of said first and second electrodes of said first capacitor;

a second rectifying means interposed in the connection between said one of said first and second electrodes of said second capacitor and said one of said first and second electrodes of said first capacitor, said second rectifying means comprising a second diode having a cathode connected to said one of said first and second electrodes of said first capacitor and an anode connected to said one of said first and second electrodes of said second capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period;

an output terminal connected to the anode of said second diode defining said second rectifying means for producing an output voltage as a power source voltage of significantly boosted magnitude over the input voltage received at said input terminal;

an output capacitor having first and second electrodes of opposite polarities, said output capacitor being connected via one of said first and second electrodes to said one of said first and second electrodes of said second capacitor and to said output terminal; and an output rectifying means interposed in the connection between said one of said first and second electrodes of said output capacitor and said one of said first and second electrodes of said second capacitor, said output rectifying means comprising a diode having a cathode connected to said one of said first and second electrodes of said second capacitor and an anode connected to said output terminal;

said first, second and output rectifying means being connected in series to said output terminal and cooperating to produce a steady-state D.C. voltage of negative potential as the output voltage at said output terminal.

8. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrodes thereof to said one of said first and second electrodes of said first capacitor;

a second rectifying means interposed in the connection between said one of said first and second electrodes of said second capacitor and said one of said first and second electrodes of said first capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period;

said first and second rectifying means respectively comprising first and second rectifying switches operably connected to said switching control means for operation in common with said second and fourth switches in assuming an ON/OFF state in unison with said second and fourth switches respectively;

an output terminal connected to said second rectifying switch for producing an output voltage as a power source voltage of significantly boosted magnitude over the input voltage received at said input terminal;

an output capacitor having first and second electrodes of opposite polarities, said output capacitor being connected via one of said first and second electrodes to said one of said first and second electrodes of said second capacitor and to said output terminal; and an output rectifying means comprising a diode interposed in the connection between said one of said first and second electrodes of said output capacitor and said one of said first and second electrodes of said second capacitor, said diode having an anode connected to said one of said first and second electrodes of said second capacitor and a cathode connected to said one of said first and second electrodes of said output capacitor and to said output terminal.

9. A charge pump circuit comprising:

an input terminal for receiving an input voltage from a power voltage source;

a first capacitor having first and second electrodes of opposite polarities, said first capacitor being connected via one of said first and second electrodes to said input terminal;

a first rectifying means interposed in the connection between said one of said first and second electrodes of said first capacitor and said input terminal;

said first capacitor being connected via the other of said first and second electrodes to said input terminal and to a predetermined reference potential;

a first switch interposed in the connection between the other of said first and second electrodes of said first capacitor and said input terminal;

a second switch interposed in the connection between the other of said first and second electrodes of said first capacitor and the predetermined reference potential;

a second capacitor having first and second electrodes of opposite polarities, said second capacitor being connected via one of said first and second electrodes thereof to said one of said first and second electrodes of said first capacitor;

a second rectifying means interposed in the connection between said one of said first and second electrodes of said second capacitor and said one of said first and second electrodes of said first capacitor;

said second capacitor being connected via the other of said first and second electrodes thereof to said one electrode of said first and second electrodes of said first capacitor and to the predetermined reference potential;

a third switch interposed in the connection between the other of said first and second electrodes of said second capacitor and said one electrode of said first and second electrodes of said first capacitor;

a fourth switch interposed in the connection between the other of said first and second electrodes of said second capacitor and the predetermined reference potential;

switching control means operably associated with each of said switches for alternately setting said first and second switches ON/OFF within a prescribed time period and alternately setting said third and fourth switches ON/OFF within each period of the prescribed time period;

an output terminal connected to said second rectifying means for producing an output voltage as a power source voltage of significantly boosted magnitude over the input voltage received at said input terminal;

a plurality inversion circuit connected to the output of said second rectifying means and having a second output terminal, said polarity inversion circuit comprising a third capacitor having first and second electrodes of opposite polarity, said third capacitor being connected via one of said first and second electrodes thereof to said second rectifying means, a third rectifying means connected to the other of said first and second electrodes of said third capacitor and to said fourth switch, a fifth switch interposed in the connection between said one of said first and second electrodes of said third capacitor and said second rectifying means, a fourth capacitor having first and second electrodes of opposite polarities, said fourth capacitor being connected via one of said first and second electrodes to said second rectifying means, a fourth rectifying means connected to the other of said first and second electrodes of said fourth capacitor and to the other of said first and second electrodes of said third capacitor, a sixth switch interposed in the connection between said one of said first and second electrodes of said fourth capacitor and said one of said first and second electrodes of said third capacitor, and said third and fourth rectifying means being connected in series;

said second output terminal connected to said fourth rectifying means for providing a boosted output voltage of opposite polarity comparable to the boosted output voltage provided at said first output terminal; and said fifth and sixth switches being turned ON/OFF alternately in response to switch control signals common to the turning ON/OFF alternately of said first and second switches.

10. A charge pump circuit as set forth in claim 9, wherein the one of said first and second electrodes of said third capacitor is also connected to said first output terminal.

11. A charge pump circuit as set forth in claim 9, further including an output capacitor having first and second electrodes of opposite polarities, said output capacitor being connected via one of said first and second electrodes to said one of said first and second electrodes of said second capacitor and to said first output terminal; and an output rectifying means interposed in the connection between said one of said first and second electrodes of said output capacitor and said one of said first and second electrodes of said second capacitor;

said first, second, and output rectifying means being connected in series to said first output terminal and cooperating to produce a steady-state D.C. voltage as the output voltage at said first output terminal.

12. A charge pump circuit as set forth in claim 10, further including an output capacitor having first and second electrodes of opposite polarities, said output capacitor being connected via one of said first and second electrodes to said one of said first and second electrodes of said second capacitor and to said first output terminal; and an output rectifying means interposed in the connection between said one of said first and second electrodes of said output capacitor and said one of said first and second electrodes of said second capacitor;

said first, second, and output rectifying means being connected in series to said first output terminal and cooperating to produce a steady-state DC voltage as the output voltage at said first output terminal.

* * * * *